(12) United States Patent
Sandi-Tapia et al.

(10) Patent No.: US 7,732,080 B2
(45) Date of Patent: Jun. 8, 2010

(54) CATALYTIC MEMBRANES FOR CO OXIDATION IN FUEL CELLS

(75) Inventors: Giselle Sandi-Tapia, Glen Ellyn, IL (US); Kathleen Carrado Gregar, Naperville, IL (US); Riza Kizilel, Chicago, IL (US)

(73) Assignee: UChicago Argonne, LLC, Argonne, IL (US)

( * ) Notice: Subject to any disclaimer, the term of this patent is extended or adjusted under 35 U.S.C. 154(b) by 1444 days.

(21) Appl. No.: 11/113,739

(22) Filed: Apr. 25, 2005

(65) Prior Publication Data

US 2006/0240304 A1   Oct. 26, 2006

(51) Int. Cl.
*H01M 8/04* (2006.01)
(52) U.S. Cl. .................. 429/34; 423/655; 423/656; 502/325; 502/328
(58) Field of Classification Search .................. 429/34; 423/655, 656; 502/325, 328
See application file for complete search history.

(56) References Cited

U.S. PATENT DOCUMENTS

| | | | |
|---|---|---|---|
| 4,186,110 | A | 1/1980 | Jalan et al. |
| 4,316,944 | A | 2/1982 | Landsman et al. |
| 5,888,273 | A | 3/1999 | Buxbaum |
| 6,168,650 | B1 | 1/2001 | Buxbaum |
| 6,395,405 | B1 | 5/2002 | Buxbaum |
| 6,461,408 | B2 | 10/2002 | Buxbaum |
| 6,576,350 | B2 | 6/2003 | Buxbaum |
| 6,746,597 | B2 * | 6/2004 | Zhou et al. ............... 208/138 |
| 7,270,798 | B2 * | 9/2007 | Hagemeyer et al. ......... 423/655 |

OTHER PUBLICATIONS

K.A. Carrado, L. Xu., 1998. "In Situ Synthesis of Polymer-Clay Nanocomposites From Silicate Gels," Chem. Mater. 10, 1440-1445.*
Y. Hasegawa., 2002. The influence of feed composition on CO oxidation using zeolite membranes loaded with metal catalysts. Micropor. Mesopor. Mater., 53, 37-43.*
K.A. Carrado, et al., Polymer-Clay Nanocomposites, G. Beall & T.J. Pinnavaia, Eds., Wiley & Sons: UK, 2000, pp. 47-63.*
Gastiger, H.A., Markovic, N., Ross, P.N., J. Phys. Chem., 98, 617-625 (1994). Gastiger, H.A., Markovic, N., Ross, P.N., J. Phys. Chem., 99, 16757-16767 (1995).*
Arai, M., et al., J. Catal., 161, pp. 704-712 (1996).
Carrado, K.A., "Introduction: Clay Structure, Surface Acidity, and Catalysis,",Handbook of Layered Materials. pp. 1-38. (2004).
Carrado, K.A., et al., "Crystallization and Textural Porosity of Synthetic Clay Minerals," J. Mater. Chem. 12, 3228-3237 (2002).
K.A. Carrado, "Synthetic Organo and Polymer-Clays: Preparation, Characterization, and Material Applications." Appl. Clay Sci. 17, 1-23, (2000).

(Continued)

*Primary Examiner*—Peter D. Mulcahy
*Assistant Examiner*—Henry Hu
(74) *Attorney, Agent, or Firm*—Olson & Cepuritis, Ltd.

(57) ABSTRACT

A hydrogen permeable membrane, which includes a polymer stable at temperatures of about 200 C having clay impregnated with Pt or Au or Ru or Pd particles or mixtures thereof with average diameters of less than about 10 nanometers (nms) is disclosed. The membranes are useful in fuel cells or any device which requires hydrogen to be separated from carbon monoxide.

14 Claims, 10 Drawing Sheets

OTHER PUBLICATIONS

T.S. Koroleva et al., New Scintillation Materials and Scintiblocs for Neutron and gamma rays registration, Nuclear Instruments and Methods in Physics Research A 537 (2005) 415.

G.C. Tyrell, Nuclear Instruments and Methods in Physics Research A 546 (2005) 180-187.

J.B. Harrison, V.E.Berkheiser, G.W Erdos., 1988. Hydrogen reduction of Pt(NIH3)42~ supported on montmorillonite. J. Catal. 112, 126-134.

Y. Hasegawa ., 2002. The influence of feed composition on CO oxidation using zeolite membranes loaded with metal catalysts. Micropor. Mesopor. Mater., 53, 37-43.

Liu, W., et al., 1999. Saturation of aromatics and aromatization of C-3 and C-4 hydrocarbons over metal loaded pillared clay catalysts. Catal. Today 51, 135-140.

Komarneni, S., et al., 1995. Microwave-hydrothermal processing of metal-clusters supported in and/or on montmorillonite. Eur. J. Sol. St. Inorg. Chem. 32, 837-849.

Mastalir, A., 2002. Preparation and characterization of platinum nanoparticles immobilized in dihydrocinchonidine-modified montmorillonite and hectorite. Appl. Clay Sci. 22, 9.

Matayabas, J.C., Turner, Sr., Polymer-Clay Nanocomposites, Pinnavaia, T.J., Beall, G.W., Eds., New York: John Wiley & Sons, chap. 11.

Montialla, F., et al., 2002. Carbon-ceramic composites from coal tar pitch and clays: application as electrocatalyst support. Carbon 40, 2193-2220.

Smith, L.J., et al., Solid-State Ionics—2002. MRS Symp. Proc., vol. 756, pp. 339-344.

Szollosi, G., 2001. Preparation, characterization and application of platinum catalysts immobilized on clays. Solid State Ionics, 141-142, 273-278.

Tsai, T.Y., 2000. Polyethylene terephthalate-clay nanocomposites. Polymer-Clay Nanocomposites, Pinnavaia, T.J., Beall, G.W., Eds., New York: John Wiley & Sons, chap. 9.

Vicente, M.A., et al., 2002. Application of Pt/intercalated clays supported catalysts to the complete oxidation of acetone. Affinidad 59, 262-266.

Vicente, M.A., Lambert, J.F., 2001. Synthesis of Pt pillared clay nanocomposite catalysts from [PtII(NH3)(4)]Cl-2 precursor. Phys. Chem. Chem. Phys. 3, 4843-4852.

N.C. Otto, P.F. Howard, Fuel Cell Seminar-Program and Abstracts, Nov. 17-20, 1996, pp. 559-562, Orlando, FL.

F. Arfelli et al., Mammography with Synchrotron Radiation: Phase Detection Techniques, Radiology, Apr. 2000, vol. 215, No. 1, 286-293.

K.P. Nicholson et al. Some Lithium Iodide Phosphors For Slow Neutron Detection, British Journal of Applied Physics, Vo. 6, Mar. 1955.

R. Parsons, T. Vandernoot, J. Electroanal. Chem., 9, 257 (1988).

G. Sandi, H. Joachin, R. Kizilel, S. Seifert, K.A. Carrado, Chemistry of Materials, 15 (4), 838, 2003.

G. Sandi, K.A. Carrado, H. Joachin, W. Lu, J. Prakash, Journal of Power Sources, 119-121C, 492-496, 2003.

M. Sonoda et al., Computed Radiography Utilizing Scanning Laser Stimulated Luminescence, Radiology, vol. 148, No. 3, Sep. 1983, 833-838.

T. Frelink et al., The Effect of Sn On Pt/C Catalysts For The Methanol Electro-Oxidation, Electrochemica Acta, vol. 39, No. 11/12, 1871-1875, 1994.

M. Doeff, J.S. Reed, Solid State Ionics, 113-115, 109, 1998.

A.R. Mermut, A.F. Cano, Clays and Clay Minerals, 49, 381, 2001.

Buxbaum, R., "Membrane Reactors, Fundamental and Commercial Advantages, e.g, for Methanol Reforming."15TH BCC Membrane Planning Conference, Newton, MA. Oct. 27-29, 1997.

Lofton, L., "Clay Polymer Nanocomposites for Pressure-Sensitive Adhesives." www.adhesivesmag.com (2004).

Hay, J.N., Shaw, S.J., "Clay-Based Nanocomposites." www.azom.com.

Messer, A.E., Fong, V., "Polymer-Clay Nanocomposites Exhibit Unique Properties." www.about.com (2001).

Nice, K., "How Fuel Cells Work." science.howstuffworks.com/fuelcell2.htm.

Campbell, S., Stumper, J., Wilkinson, D., 1997 Joint International Meeting of ECS/ISE, Paris, Extended Abst., p. 87.

Parsons, R., Vandernoot, T., J. Electroanal. Chem., 9, 257 (1988).

Ross, P.N., et al., J. Electroanal. Interfacial Electrochem., 59, 177 (1975).

Rauhe Jr., B.R., McLarnon, F.R., Cairns, E.J., J. Electrochem. Soc., 142, 1073 (1995).

O'M Bockris, J., Wroblowa, H.J., J. Electroanal. Chem., 7, 428 (1964).

Freelink, T., Visscher, W., Van Veen, J.A.R., Electrochim. Acta, 39, 1871 (1994).

Freelink, T., et al., Electrochim. Acta, 40, 1537 (1995).

Watanabe, M., Uchida, M., Motoo, S., J. Electroanal. Chem., 229, 395 (1987).

Watanabe, M., Furuchi, Y., Motoo, S., J. Electroanal. Chem., 191, 367 (1985).

Gastiger, H.A., Markovic, N., Ross, P.N., J. Phys. Chem., 99, 16757 (1995).

Gastiger, H.A., Markovic, N., Ross, P.N., J. Phys. Chem., 99, 8290 (1995).

Gastiger, H.A., Markovic, N., Ross, P.N., J. Phys. Chem., 98, 617 (1994).

Iamiiello, R., et al., Electrochim. Acta, 39, 1863 (1994).

Jayaram, V., Lin, Y.S., J. Membrane Sci., 104, 251 (1995).

Watanabe, M., Motoo, S., J. Electroanal. Chem., 60, 275 (1975).

Haner, A.N., Roos, P.N., J. Phys. Chem., 95, 3740 (1991).

Bae, I.T., Takeshi, S., Scherson, D.A., J. Electroanal. Chem., 297, 185 (1991).

Ticanelli, E., et al., J. Electroanal. Chem., 258, 61 (1989).

Freelink, T., Visscher, W., Van Veen, J.A.R., Surface Science, 335, 353 (1995).

Chang; J.H., et al., J. Power Sources 124,18-25 (2003).

Hackett, E., Manias, E., E.P. Giannelis, Chemical Materials, 12, 2161, 2000.

\* cited by examiner

CATALYTIC MEMBRANES FOR CO OXIDATION IN FUEL CELLS

The United States Government has rights in this invention pursuant to Contract No. W-31-109-ENG-38 between the U.S. Department of Energy (DOE) and The University of Chicago representing Argonne National Laboratory.

FIELD OF THE INVENTION

Hydrogen permeable membranes useful in fuel cells permit the passage of hydrogen to Pt catalyst-containing electrodes while preventing carbon monoxide (CO) from passing through and poisoning the catalyst.

BACKGROUND OF THE INVENTION

Fuel cells are devices that directly convert chemical energy of fuel cells into electrical energy. Fuel cells based on polymer electrolyte (PEFC) have been extensively studied for their potential applications in transportation, stationary, and portable energy devices, see N. C. Otto, P. F. Howard, *Fuel Cell Seminar-Program and Abstracts*, Orlando, Fla., pp. 559-562, Nov. 17-20, 1996, the disclosure of which is incorporated herein by reference. Three types of PEFC can be visualized based on the nature of the fuel used in these systems. These are: 1) $H_2$/Air fuel cells, which use pristine hydrogen, 2) Reformate/Air fuel cell, which uses hydrogen generated by reforming fossil fuels such as methanol and gasoline, and 3) Direct Methanol fuel cell, where methanol is used as a fuel and is directly oxidized at the anode.

In the $H_2$/Air fuel cell, the hydrogen electrode generally performs satisfactorily with an overpotential of about 20-30 mV at the operating current densities of 200-400 mA/cm². In reformate fuel cells, however, their performance is greatly diminished due to carbon monoxide and sulfur poisoning. These impurities are always present in the hydrogen stream produced during reforming of natural gas or petroleum. Typically, the water gas shift reaction used in the reformate fuel cells reduces the CO content to only about 1%. This is relatively higher than the CO tolerance of a typical anode catalyst. The CO poisoning is the most critical problem in the solid electrolyte fuel cells operating at 100° C., because even very small CO levels can be detrimental to the performance of the hydrogen electrode, see H. P. Dhar, L. G. Christner, A. K. Kush, *J. Electrchem. Soc.*, 134, 3021 (1987), the disclosure of which is incorporated herein by reference. The CO poisoning results in overall voltage losses for the fuel cell due to high anodic polarization. It has been shown that the presence of even 30 ppm carbon monoxide in the reformate gas significantly reduces the performance of 5 kW Ballard fuel cell, see S. Swathirajan, 1994 Fuel Cell Seminar, *Ext. Abs.*, 204 (1994), the disclosure of which is incorporated herein by reference. Several solutions have been proposed to alleviate the CO poisoning problem. These solutions include water-gas shift reaction, membrane separation (Pd—Ag membrane) process, and introducing oxygen into hydrogen-CO containing fuels.

For DMFC, on the other hand, sluggish kinetics of methanol oxidation and methanol cross-over are the main barriers for its commercialization. The sluggish kinetics of the methanol electrooxidation is due to the poor catalytic activity of platinum anodes for the anode reaction:

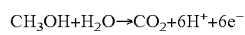

$$CH_3OH+H_2O \rightarrow CO_2+6H^++6e^-$$

On a clean pristine platinum surface, the methanol electrooxidation is quite rapid. However, the formation of carbon monoxide as an intermediate in the above reaction poisons the platinum surface and hence greatly inhibits its activity toward methanol oxidation, see R. Parsons and T. VanderNoot, *J. Electroanal. Chem.*, 9, 257 (1988).

In recent years, a new class of materials has been developed by dispersing layered silicates with polymers at the nanoscale level. These new materials have attracted wide interest because they often exhibit chemical and physical characteristics that are very different from the starting materials, see K. A. Carrado. *Appl. Clay Sci.* 17, 1, 2000, K. A. Carrado, in *Advanced Polymeric Materials: Structure Property Relationships*, S. G. Advani, G. O. Shonaike, Eds.; CRC Press LLC, Boca Raton, Fla., 2003, pp. 349-396, and G. Sandi, H. Joachin, R. Kizilel, S. Seifert, and K. A. Carrado, *Chemistry of Materials*, 15 (4), 838, 2003, the disclosures of which are incorporated herein by reference. In some cases, the silicates and polymers exist as alternating layers of inorganic and organic, see K. A. Carrado, L. Xu, S. Seifert, R. Csencsits, C. A. Bloomquist, in Polymer-Clay Nanocomposites, G. Beall & T. J. Pinnavaia, Eds., Wiley & Sons: UK, 2000, pp. 47-63 and G. Sandi, K. A. Carrado, H. Joachin, W. Lu and J. Prakash, *Journal of Power Sources*, 119-121, 492, 2003, the disclosures of which are incorporated herein by reference. Nanocomposite materials of PEO and phyllosilicates were first suggested by Ruiz-Hitzky and Aranda, see E. Ruiz-Hitzky, P. Aranda, *Adv. Mater*, 2, 545, 2003, incorporated herein by reference, as candidates for polymer electrolytes. Within these materials, the polymer chains are intercalated between the silicate layers. The polymer chains then provide a mobile matrix in which cations are able to move. A considerable amount of interest has been shown in nanocomposites of PEO and montmorillonite, a layered aluminosilicate clay. When this composite contains $LiBF_4$, it displays conductivities up to 2 orders of magnitude larger than that of PEO itself at ambient temperatures. However, the addition of lithium salts, which is needed to obtain such conductivity values, is not desirable for two reasons; the first relates to a more complicated synthetic route and the second is that transference numbers are not unity since in this case both cations and anions move.

SUMMARY OF THE INVENTION

Accordingly, an object of the invention is to provide a polymer nanocomposite membrane for energy applications and more particularly, for fuel cells that directly convert chemical energy fuels to electrical energy.

Another object of the invention is to provide a hydrogen permeable membrane, comprising a polymer stable at temperatures of about 200° C. having therein clay impregnated with Pt or Au or Ru or Pd particles or mixtures thereof with average diameters of less than about 10 nanometers (nms).

A further object of the invention is to provide a hydrogen permeable membrane, comprising a polymer stable at temperatures of about 200° C. having therein a hectorite or a montmorillonite clay or mixtures thereof impregnated with about 2% to about 4% by weight Pt or Au particles or mixtures thereof with average diameters of less than about 10 nanometers (nms).

Yet another object of the invention is to provide a fuel cell comprising, an anode and a cathode connected by a circuit exterior of the fuel cell, the anode when in contact with hydrogen in a hydrogen containing gas causing the hydrogen to disassociate into electrons flowing from the anode to the exterior circuit and protons, the protons passing to the cathode where contact with oxygen and a catalyst causes the protons and electrons from the exterior circuit to combine with oxygen to form water, and a hydrogen permeable membrane associated with the anode and including a polymer stable at temperatures of about 200° C. having therein clay impregnated with Pt or Au or Pd or Ru particles or mixtures thereof with average diameters of less than about 10 nanometers (nms), whereby carbon monoxide present in the hydrogen containing gas coming in contact with the hydrogen permeable membrane is converted to carbon dioxide while hydrogen passes therethrough to the anode.

A final object of the invention is provide a device for separating hydrogen from a fluid containing hydrogen contaminated with carbon monoxide, comprising a hydrogen permeable membrane with a polymer stable at temperatures of about 200° C. having therein clay impregnated with Pt or Au or Ru or Pd particles or mixtures thereof with average diameters of less than about 10 nanometers (nms), and mechanism including conduits and pumps for bringing the hydrogen contaminated with carbon monoxide in contact with the hydrogen permeable membrane to separate hydrogen therefrom.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
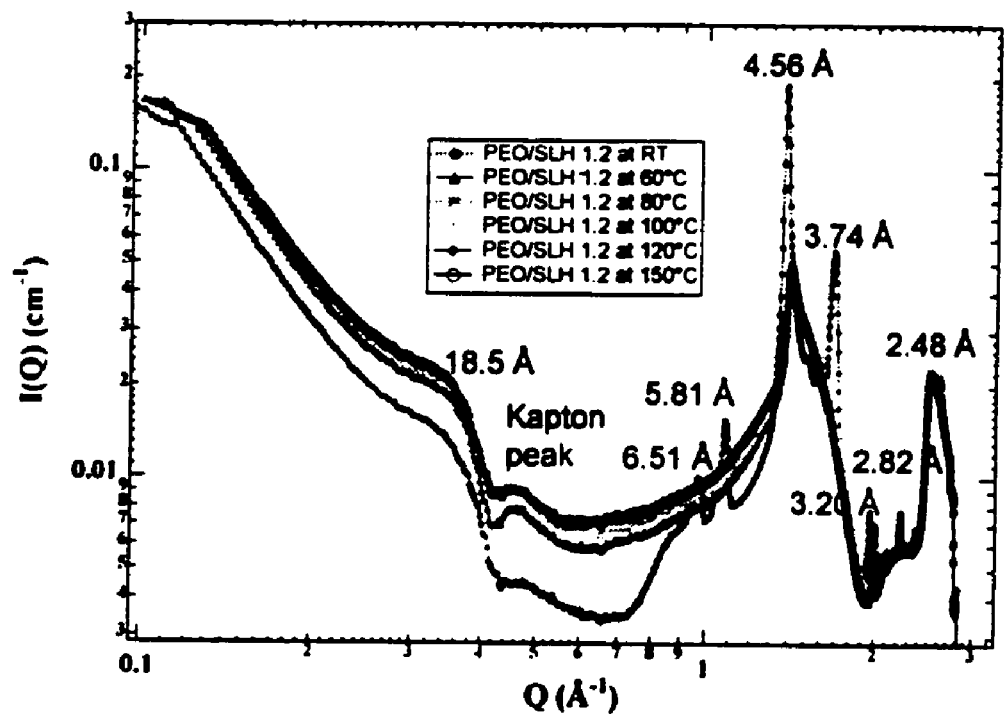
FIG. 1 is a graphical representation of an in situ SAXS of a PEO:SLH 1.2:1 ratio polymer-clay film

A series of nanocomposites containing PEO intercalated in the layers of hectorite (SLH, synthetic lithium hectorite) clays was prepared. Catalytic nanocomposite membranes were prepared by dispersing the clay in water with a platinum salt and water-soluble polymer. Transparent, self-supporting membranes from the polymer-clay nanocomposite were then made. The resulting films were reduced under $H_2$ at 150° C. for 2-4 hours, turning black upon reduction. The final film contained Pt(0) at 2.4 weight percent loading levels. XRD showed development at Pt(0) by the appearance of crystalline peaks upon reduction. A line shape analysis using the Scherrer equation of the (220) peak showed Pt(0) particles from 3.8 nm to 7.5 nm depending upon processing conditions. These values were confirmed by TEM, and a high dispersion of the metal throughout the matrix was evident. XRD and TGA confirmed that PEO was stable to the processing conditions.

Preparation of the synthetic-lithium hectorite (SLH) clay via hydrothermal crystallization at 100° of silica sol, magnesium hydroxide, and lithium fluoride is disclosed in K. A. Carrado. *Appl. Clay Sc.* 17, 1, 2000. Loading of Pt(II) salt was accomplished via a wet impregnation method by adding 0.5 gm clay to a 2.5 mM aqueous cis-$Pt(NH_3)_2Cl_2$ solution and stirring for 24 hours. This yields a material that has 4.65 weight percent Pt. The impregnation method was followed rather than an ion-exchange method in order to ensure that all of the metal used was associated with the clay. The desired amount of PEO (100,000 average molecular weight, from Aldrich) was then added to either the pure clay or the Pt-salt-clay, and the mixture stirred for 24 hours. Mixtures contained 0.6, 0.8, 1.0 and 1.2 g of PEO/g of clay. Films were prepared by puddle-casting the slurries onto Teflon-coated glass plates and air-drying. Further drying was carried out at 120° C. under an inert atmosphere for at least 48 hours. The typical thickness of the films is about 40 µm. The reduction of $Pt^{2+}$ to Pt(0) nanoclusters in the catalytic membranes is accomplished by thermal reduction under $H_2$ at temperatures higher than 120° C.

XRD patterns were recorded on a Rigaku Miniflex+ with Cu $K_\alpha$ radiation, a 0.05° 2Θ step size, and 0.5 ° 2Θ scan rate; the films were held in a horizontally-mounted sample stage. Lateral crystallite size of the Pt(0) nanoclusters was estimated from the line broadening of the (220) reflection using the Scherrer equation; $L=0.91 \lambda/B \cos \Theta_{max}$ where L=crystallite size in Å, $\lambda=CuK_\alpha=1.5405$ Å, $B=sqrt(B_{obs}^2-b^2)$; $B_{obs}$=FWHM (220) reflection in radians observed, b=FWHM instrumental correction (in this case Si(220) reflection).

TEM images were acquired using a FEI TECHAI F30ST operating at 300 kV with a CCD camera. One drop of Pt(0)-PCN slurry in MeOH (sonicated for 1 hour) was placed onto 3 mm holey carbon Cu grids; excess solution was removed and the grid dried at 100° C. for 10 minutes. TGA was performed using an EXSTAR6000 Seiko Haake instrument at a heating rate of either 10° C./min (for pure clay) or 0.5° C./min. (clay systems containing polymer) under 100 ml/min $O_2$ gas flow using 2-3 mg sample.

In situ SAXS and GISAXS were carried out at the Sector 12 of the Advanced Photon Source at Argonne National Laboratory. For the SAXS measurements, monochromatic x-rays (18 keV) were scattered and collected on a 15×15 $cm^2$ CCD camera. The scattering intensity was corrected for adsorption and instrument background. The differential scattering cross section was expressed as a function of scattering vector q. The value of q is proportional to the inverse of the length scale ($Å^{-1}$). The instrument was operated with a sample to operator detector distances of 228 and 390 mm to obtain data at $0.01<q<0.3$ $Å^{-1}$ and at $0.08$ $q<2.3$ $Å^{-1}$, respectively. For these examples, a specially designed sample holder was used to heat the sample and collect SAXS data at the same time. Films of about 1.25 cm in diameter and 40 µm in thickness were placed in the sample holder and held using Kapton tape. The furnace temperature program was set to ramp from room temperature to 200° C. at 5° C./min. and the gas flow of $H_2$ and He was started at room temperature. For the GISAXS experiments, the membranes were deposited on a silica substrate and in incident angle of 0.15°.

FIG. 1 shows SAXS data obtained from a film made of PEO/SLH 1.2:1 mass ratio. The data was collected at different room temperatures, as shown in the inset. It is clear that the structure of the polymer has changed as indicated by the near complete disappearance of the PEO crystalline peaks. It is believed that the polymer chains relaxed inside the clay layers. Other evidence of such relaxation is the decrease in d001 spacing, which indicates a more dense polymer phase. Under these circumstances, the polymer matrix is more mobile and the lithium ions associated with the polymer can have higher transference number, leading to a higher conductivity.

Figure 2:
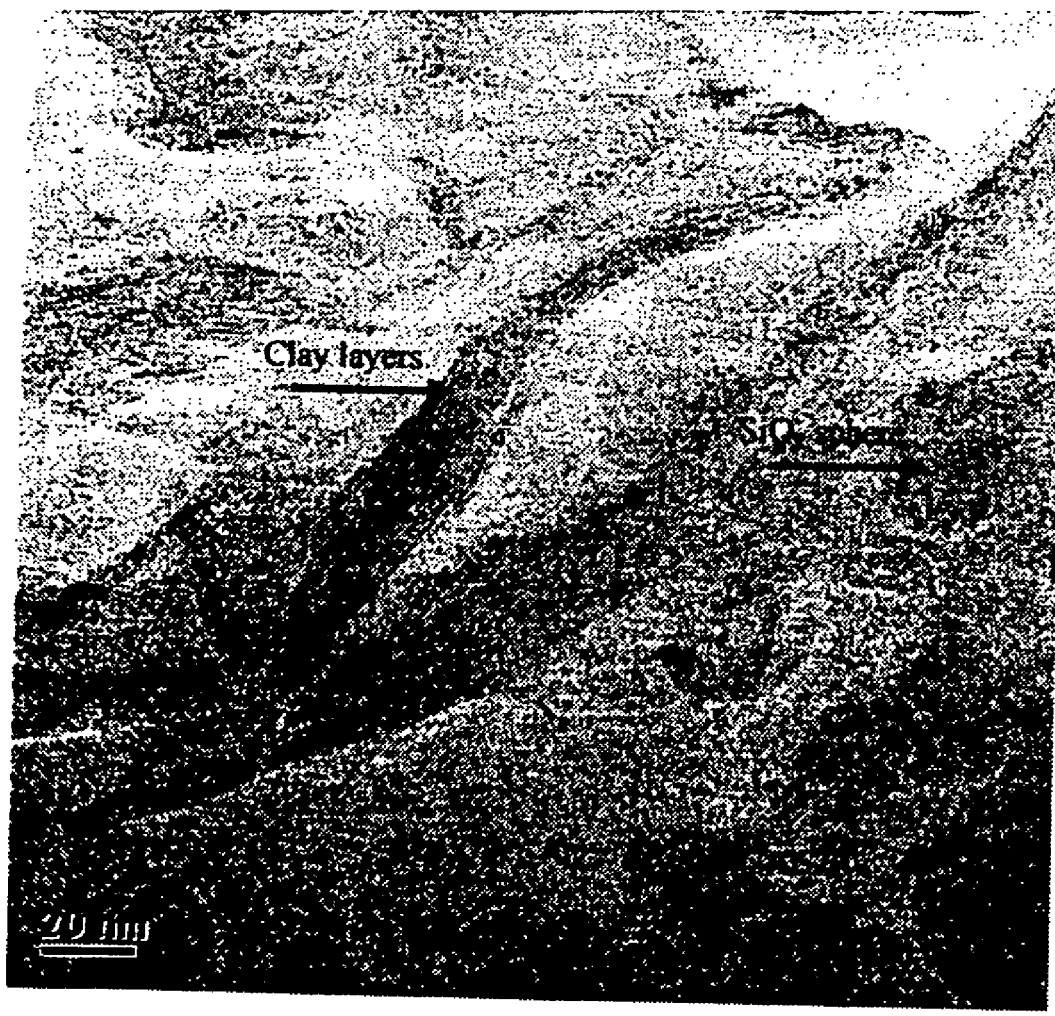
FIG. 2 is a TEM high resolution of a 1:1 PEO:SLH mass ratio nanocomposite membrane of the present invention.

FIG. 2 shows a high resolution TEM image of a membrane made of PEO: clay in a 1:1 weight ratio. Small 15 nm disks due to silica spheres are visible throughout the background. F. Croce, R. Curini, A. Martinelli, L. Persi, F. Ronci, B. B. Scrosati and F. Croce, *J. Electrochem Soc.*, 5, 1718, 2000, demonstrated that by dispersing selected low-particle size ceramic powders (γLiAlO or $TiO_2$) in PEO-LiX polymer electrolytes nanocomposites, enhanced interfacial stability as well as improved conductivity at ambient temperature was achieved. Commercially available laponite such as that used by M. Doeff and J. S. Reed, *Solid State Ionics*, 113-115, 109, 1998, does not contain silica particles. As discussed by A. R. Mermut and A. F. Cano, *Clays and Clay Minerals*, 49, 381, 2001, other clay materials such as those recently used by E. Hackett, E. Manias and E. P. Giannelis, *Chem. Mater.*, 12, 2161, 2000, contain negligible amounts of silica impurities.

Figure 3:
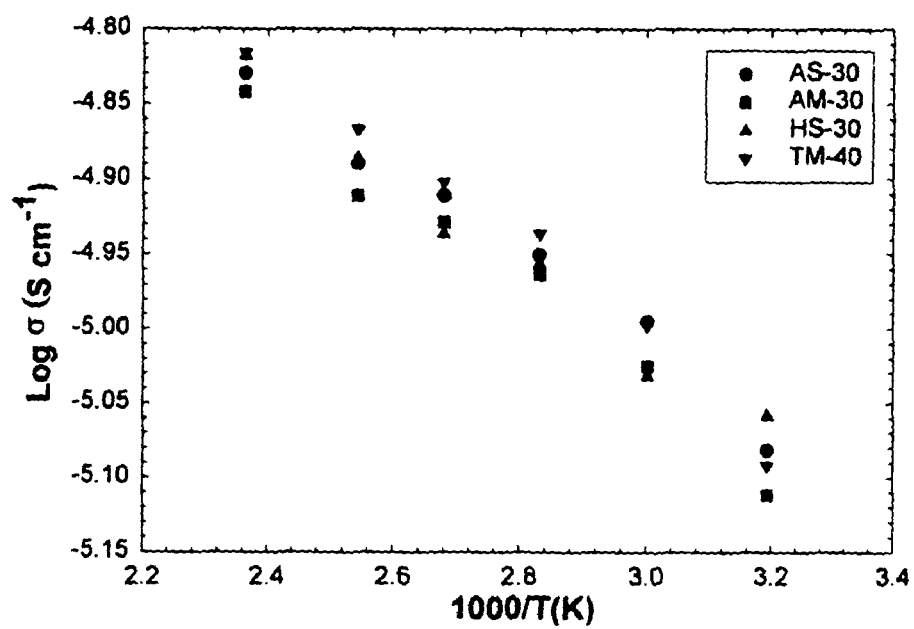
FIG. 3 is a graphical representation of Arrhenius conductivity plots as a function of temperature of nanocomposite membranes with nominal composition PEO:SLH 1.2:1 mass ratio.

FIG. 3 shows the Arrhenius conductivity plot in the temperature range from room temperature to 150° C. for the sample prepared with a PEO:SLH 0.6:1 mass ratio and different silica precursors as indicated in the graph inset. The conductivity of the polymer nanocomposites increased as the sample was heated from room temperature (26.0° C.) to 150° C. As discussed by G. Sandi, K. A. Carrado, H Joachin, W. Lu and J. Prakash, *Journal of Power Sources*, 119-121, 492, 2003, the slope change or break that occurs in many polymeric materials is absent in the inventive system.

Figures 4A, 4B:
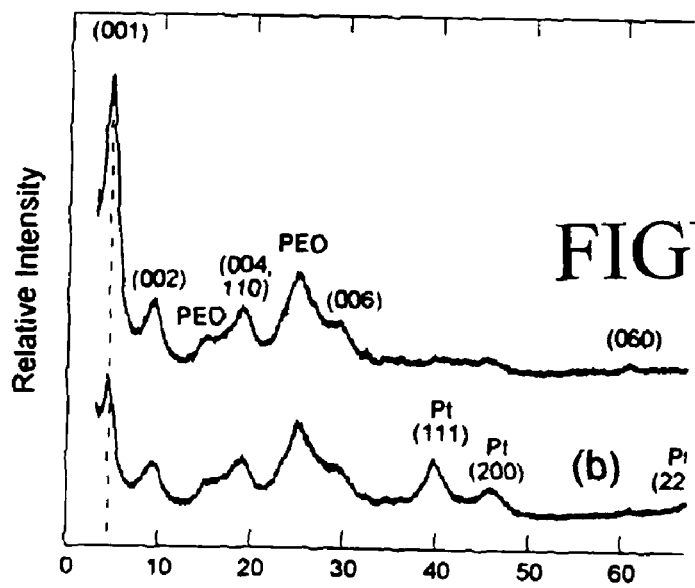
FIG. 4a is a graphical representation of XRD of Pt (II) salt PEO-PCN film before reduction.
FIG. 4b is a graphical representation of XRD of Pt(0)-PEO-PCN film after reduction.

FIG. 4 shows XRD patterns for a Pt-salt-PEO-SLH film both before and after reduction to Pt(0) in $H_2$. The clay d(001) basal spacing at 2.0 nm (4.4° 2Θ) indicates incorporation of a bilayer of PEO chains (the clay layer itself is 0.96 nm and each PEO chain is approximately 0.45 nm). The basal spacing value does not change position upon reduction, showing the stability of the PEO chains in the gallery region. Several higher orders of reflection (002, 004, 006) occur due to the layered, film arrangement and subsequent high degree of orientation of the hectorite sheets. Three new peaks due to Pt(0) metal appear upon reduction at 40.1, 46.4, and 67.6 ° 2Θ~. The crystallite size of the Pt(0) nanoclusters is estimated from the line broadening of the latter (220) reflection, using the Scherrer equation as described in the experimental section 11, at 3.8 nm diameter for this particular sample. Peaks due to PEO are also observed as indicated in FIG. 4, which do not shift or decrease upon reduction.

Figure 5:
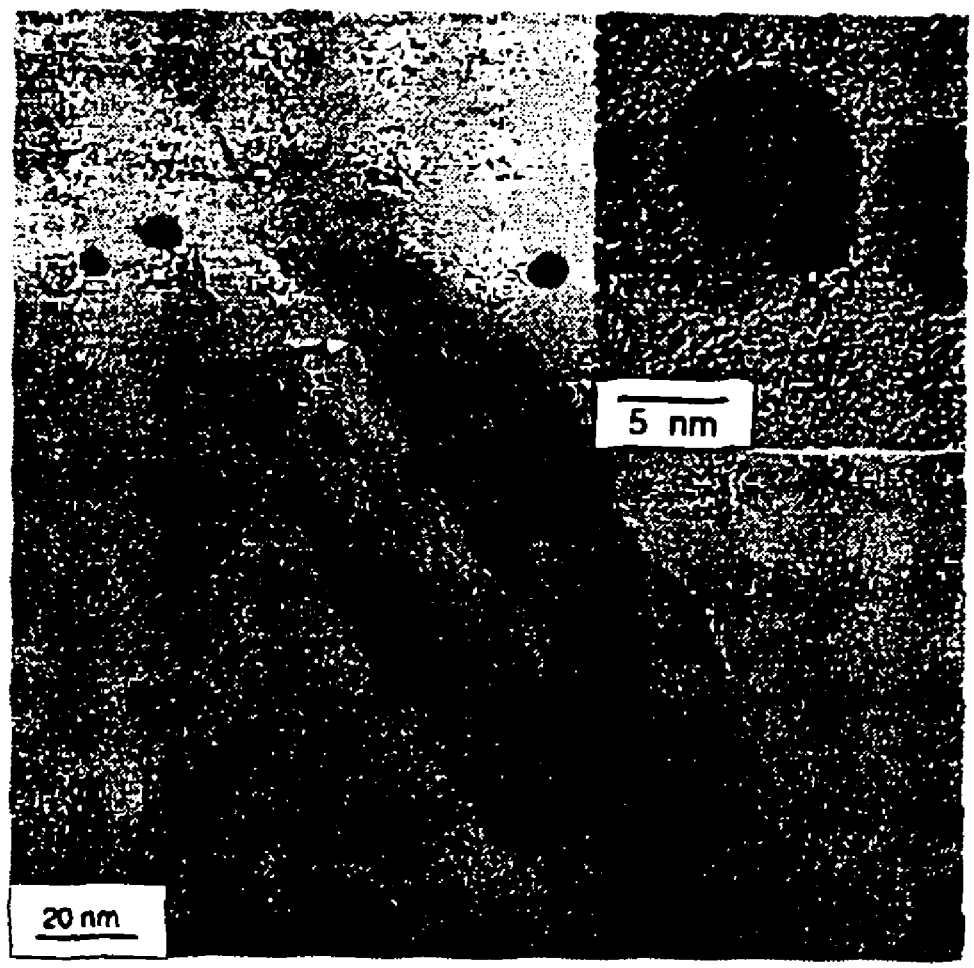
FIG. 5 is a TEM image of Pt(0)-PEO-SLH.

TEM images as a Pt(o)-PEO-SLH are shown in FIG. 5. The difference in contrast between the clay (as well as silica) and Pt(0) particles is clearly evident, making it easy to distinguish the metal. TEM also clearly shows the highly dispersed nature of the metal nanoparticles throughout the matrix, as well as the fact that some polydispersity in particle size is evident. While the majority of Pt(0) particles are spherical, a minority appears as more oblong in shape. The inset of FIG. 5 shows a HR-TEM image of a single 5 nm nanoparticle with the crystal lattice plane fringes apparent. The Pt(II) reduction process was monitored in situ via small angle x-ray scattering (SAXS) under either $H_2$ (reducing) or He (inert) flow at different temperatures. The SAXS curves were modeled using the general unified fit (GUF), which is a general equation developed to describe scattering functions that contain multiple length-scales where scattering from individual particles as well as from their aggregates are present.

Figure 6:
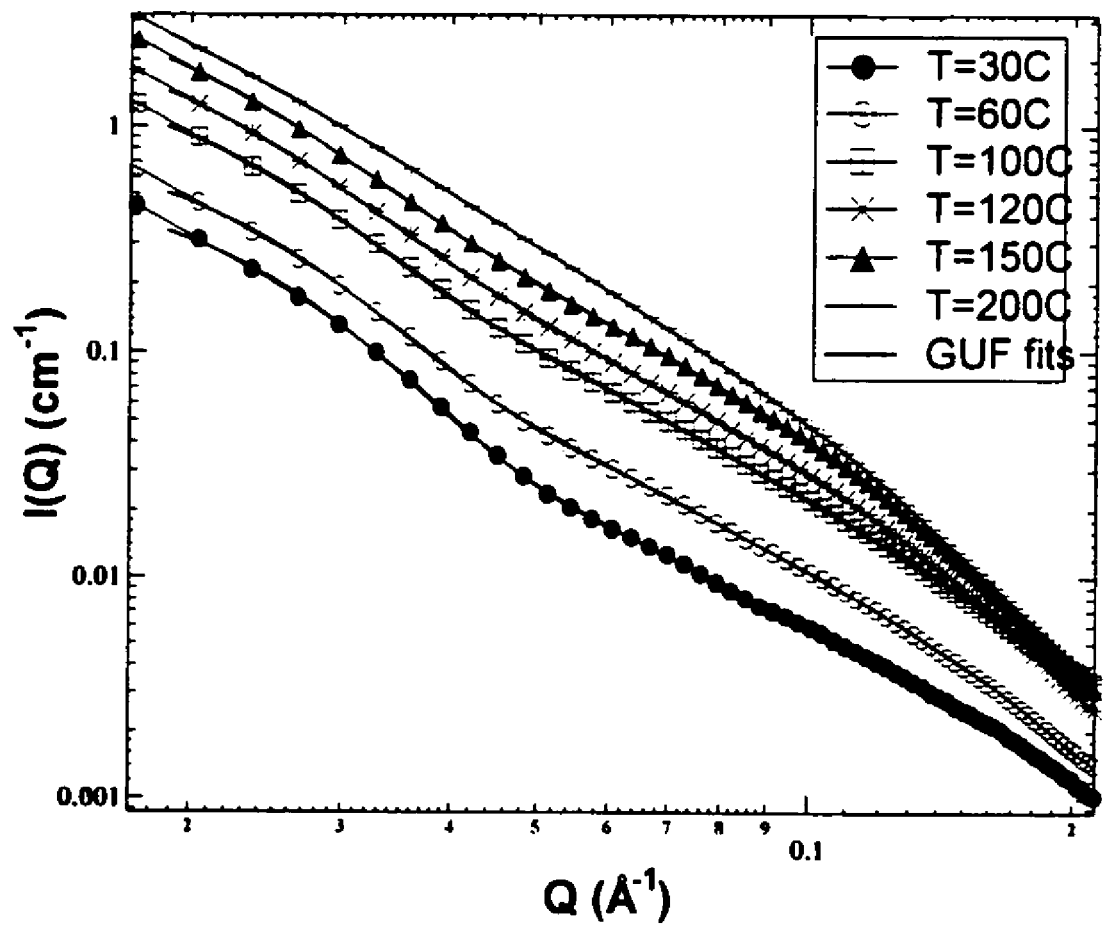
FIG. 6 is a graphical representation of log-log SAXS plot of a Pt-PEO-SLH film heated under $H_2$ flow with fits to the GUF equation.

Heating under $H_2$ at moderate temperatures (>100° C.) produces significant changes in the SAXS results, especially in the higher –Q regime (see FIG. 6). The GUF fits still extend over the entire range of the data. However, at >100° C., the qualitative change in the data is accommodated in the GUF equation by two, instead of one, structural levels with two G, B, P, and Rg values. This additional length-scale is included in Table 1. It is presumed to arise from the reduction of Pt(ii) to Pt(0) nanoclusters and the resultant scattering from these new particles. Diameters of the particles are calculated by multiplying the Rg by a constant of 2.6 (Rg=R/1.29 for spherical particles) and yield 4.8 n. at 120° C. Further heating to 200° C. does not form significantly larger nanoclusters (the size increases by just 6% to 5.1 nm).

Figure 7:
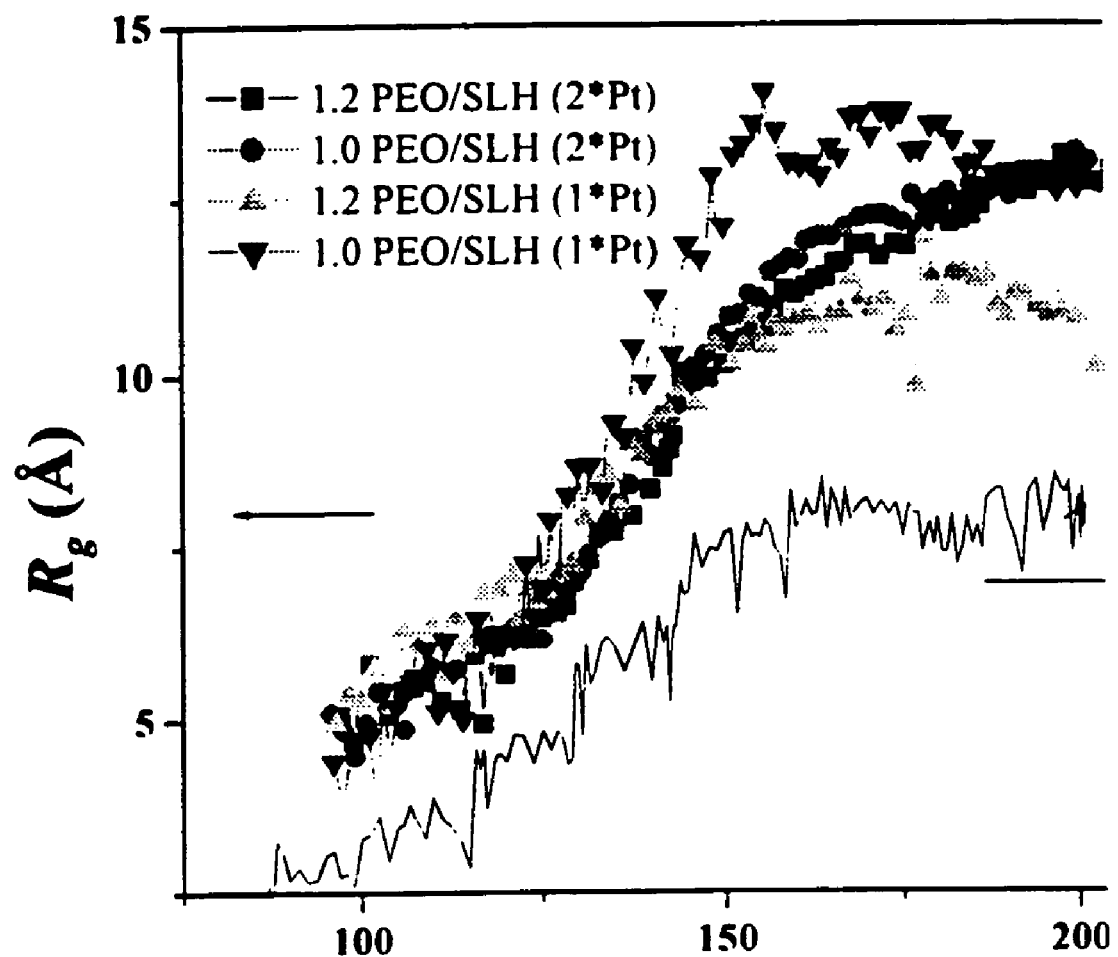
FIG. 7 is a graphical representation of in situ-GISAXS data of the Pt particle formation in catalytic membranes.

FIG. 7 shows the Rg of the Pt particles formed upon the reduction of the polymeric catalytic membranes calculated by using GISAXS. The Pt particles start to form above 100° C. and the radius reaches a plateau at about 175° C. The Rg is about 12 Å, which correspond to a 3.1 nm diameter Pt particle (Rg=R/1.29 for spherical particles). These values are consistent with those calculated by XRD or TEM techniques. There is some variability on the diameter of the Pt particles calculated by SAXS or GISAXS, but they are within experimental error. Also, dilute $H_2$ was used for the GISAXS experiments and that lead to a smaller particle being formed. That might be an advantage for practical applications, where it is desirable to keep the particles separated for a more effective catalytic activity.

Figure 8:
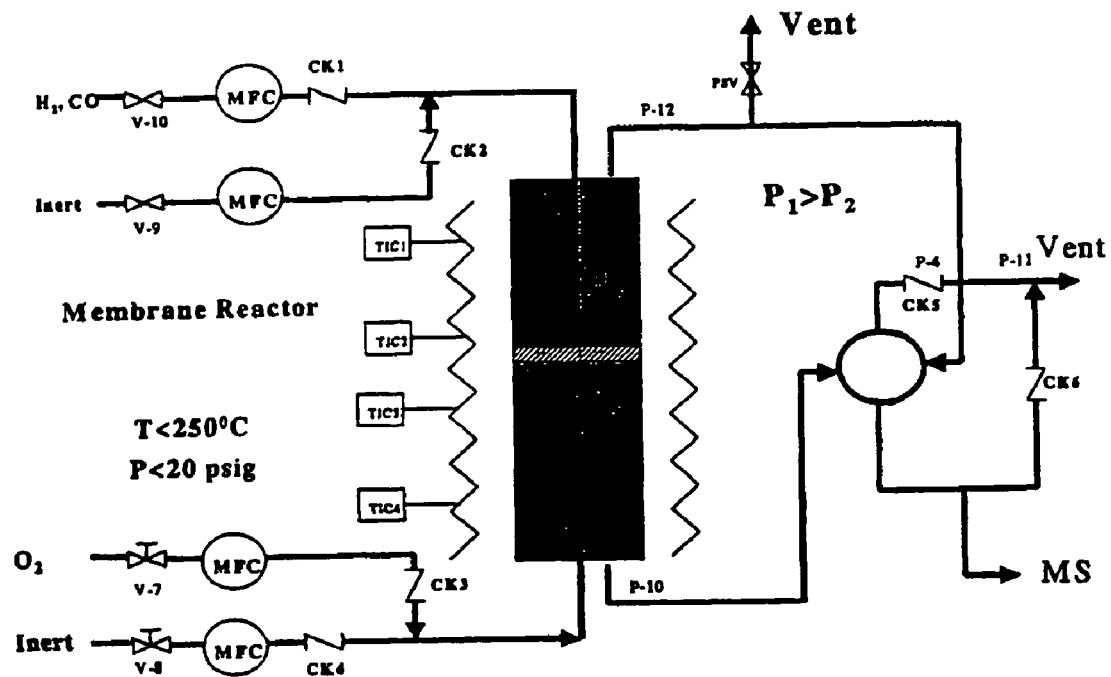
FIG. 8 is a schematic diagram of an experimental reactor designed and used in obtaining data presented herein.

Referring now to FIG. 8, there is disclosed a schematic flow diagram of an experimental unit used to produce the data reported herein. The reactor was designed to handle a variety of conditions under continuous flow under ambient temperature. The hydrogen containing feed entering the top of the reactor consisted of helium carbon monoxide and hydrogen. Each of the gases was delivered from separate cylinders and was mixed with controlled flow rates. The oxygen source was air and flowed countercurrent to the hydrogen and carbon monoxide.

Figure 9:
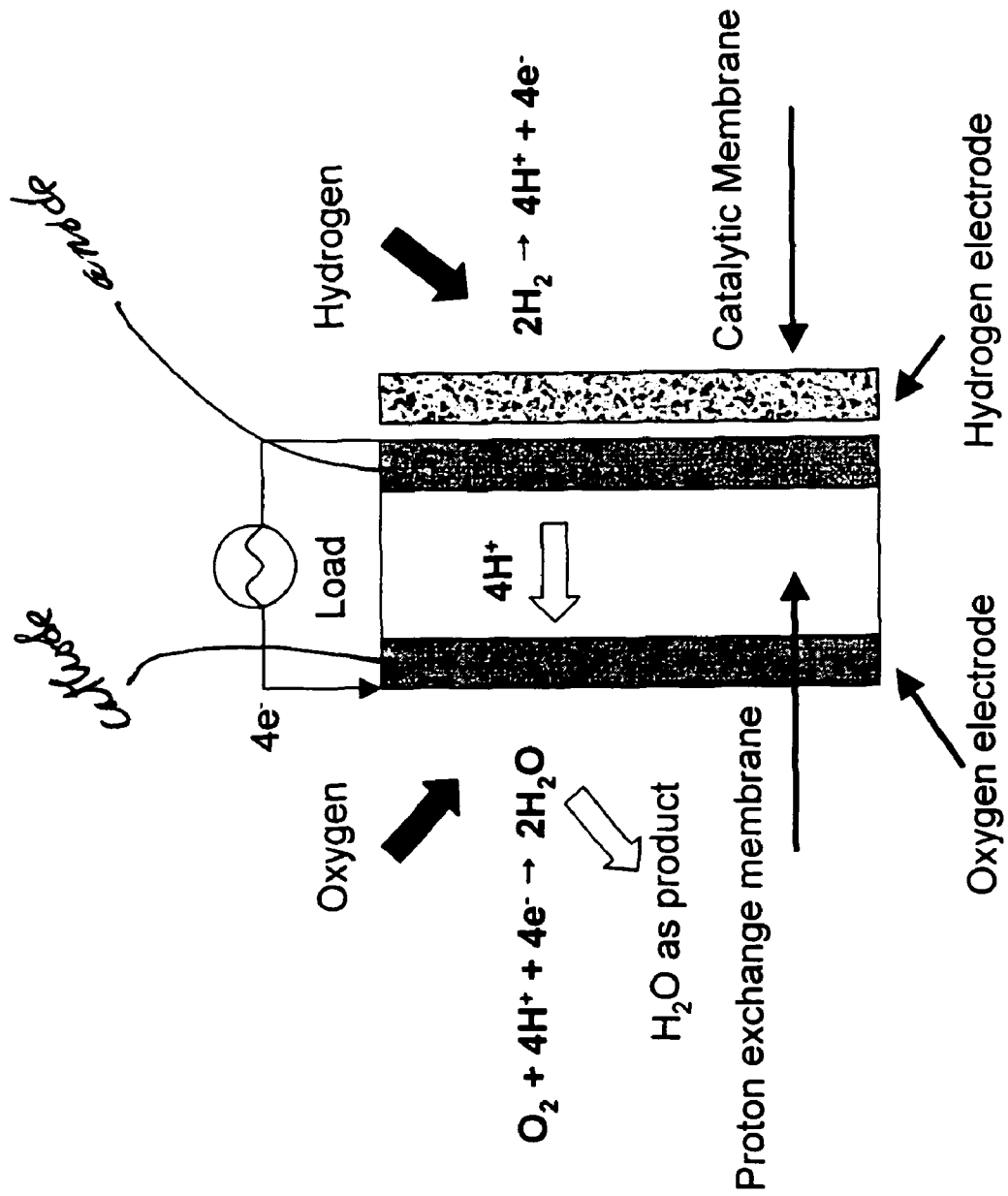
FIG. 9 is a schematic representation of a fuel cell employing an inventive catalytic membrane using a hydrogen rich fuel.
Figure 10:
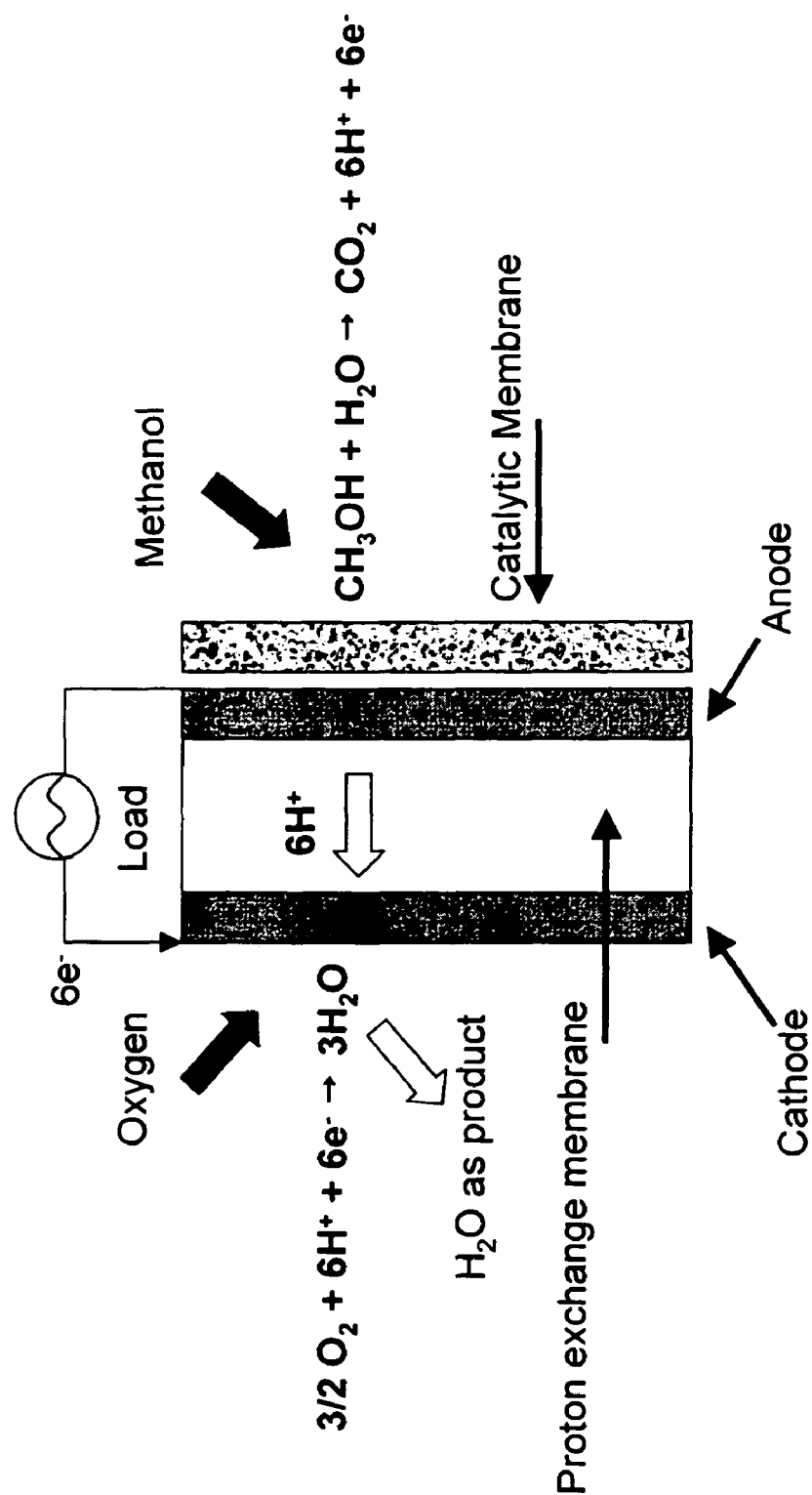
FIG. 10 is a schematic representation of a fuel cell using the catalytic membrane of the present invention with a methanol feed.

FIGS. 9 and 10, respectively, are schematic diagrams of the catalytic membrane made in the accordance with the present invention with a hydrocarbon air feed in FIG. 9 and in a methanol feed for FIG. 10. As is well known in the art, a catalyst such as nickel is used to carry out the reaction of the methanol disassociation with water. All other aspects of FIGS. 9 and 10 except of the catalytic membrane of the subject invention are well known.

Although the data reported herein and the description with respect to platinum as a catalyst and a PEO polymer, a variety of polymers may be used provided that they are stable at temperatures of about 200° C. when impregnated with clay and a variety of acceptable catalysts such as gold, ruthenium, palladium or mixtures thereof, the catalyst particles having preferably average diameters of less than about 10 nm.

A variety of clays are acceptable for use in the present invention, both synthetic and naturally occurring. A swelling clay is preferred and more particularly, a hectorite or montmorillonite clay is preferred. In general, it is preferred that the clay is present in the membrane in a range of from about 40% by weight to about 60% by weight, with 50% being preferred and of all the catalyst particles named, generally, the preferred concentration of the catalyst particles in the membrane is in the range of from about 2% by weight to about 4% by weight with 2% being preferred for reasons of cost.

In general, water soluble polymers are preferred but other polymers may be used wherein the polymer soluble in an organic solvent such as acetone, or the like, as is well known in the art. Membrane thicknesses may range from about 40 to about 400 mm. Polymers which are preferred for the present invention are polyethylene oxide or polyacrylamide or polyacrylonitrile or polyvinyl alcohol or polyvinyl pyrrolidone or polyaniline.

In general, the most preferred catalyst are platinum or gold and the preferred clay is hectorite or montmorillonite, as discussed. Fuel cells, in general, are provided with anodes and cathodes as illustrated in FIGS. 9 and 10 connected by a circuit exterior of the fuel cell. Although the membranes of the present invention have been described with respect to fuel cells, any device which has as a central purpose thereof the separation of hydrogen from carbon monoxide will be able to make use of the present invention.

While the invention has been particularly shown and described with reference to a preferred embodiment hereof, it will be understood by those skilled in the art that several changes in form and detail may be made without departing from the spirit and scope of the invention.

The embodiments of the invention in which an exclusive property or privilege is claimed are defined as follows:

1. A catalytic hydrogen permeable membrane capable of converting carbon monoxide to carbon dioxide in a gas stream containing hydrogen and carbon monoxide, comprising a polymer stable at temperatures of about 200° C. having therein clay impregnated with metal particles selected from the group consisting of Pt particles, Au particles, Ru particles, Pd particles and mixtures thereof with average diameters of less than about 10 nanometers (nms), wherein said membrane has a thickness in the range of from about 40 to about 400 micrometers.

2. The membrane of claim 1, wherein said clay is a hectorite or a montmorillonite or mixtures thereof such that said membrane is substantially impermeable to CO and permeable to $H_2$.

3. The membrane of claim 2, wherein said clay is a swelling clay.

4. The membrane of claim 1, wherein said clay is naturally occurring.

5. The membrane of claim 1 wherein said clay is synthetic.

6. The membrane of claim 1, wherein said clay is present in said membrane in the range of from about 40% by weight to about 60% by weight.

7. The membrane of claim 1, wherein said metal particles are present in said membrane in the range of from about 2% by weight to about 4% by weight.

8. The membrane of claim 1, wherein said polymer is water soluble.

9. The membrane of claim 1, wherein said polymer is soluble in an organic solvent.

10. The membrane of claim 1, wherein said polymer is one or more polymer selected from the group consisting of polyethylene oxide, polyacrylamide, polyacrylonitrile, polyvinyl alcohol, polyvinyl pyrrolidone, and polyaniline.

11. A catalytic hydrogen permeable membrane capable of converting carbon monoxide to carbon dioxide in a gas stream containing hydrogen and carbon monoxide, comprising a polymer stable at temperatures of about 200° C. having therein a hectorite or a montmorillonite clay or mixtures thereof impregnated with about 2% to about 4% by weight Pt or Au particles or mixtures thereof with average diameters of less than about 10 nanometers (nms), wherein said membrane has a thickness in the range of from about 40 to about 400 micrometers.

12. The membrane of claim 11, wherein said clay is present in said membrane in the range of from about 40% by weight to about 60% by weight.

13. The membrane of claim 11, wherein said clay is present in said membrane in the amount of about 50% by weight.

14. The membrane of claim 12, wherein Pt particles are present in the membrane and said polymer is one or more polymer selected from the group consisting of polyethylene oxide, polyacrylamide, polyacrylonitrile, polyvinyl alcohol, polyvinyl pyrrolidone, and polyaniline.

* * * * *